Feb. 5, 1924.                                              1,482,409
                    C. F. PYM ET AL
        MACHINE FOR USE IN THE LASTING OF BOOTS AND SHOES
              Filed April 14, 1919           5 Sheets-Sheet 1

INVENTORS

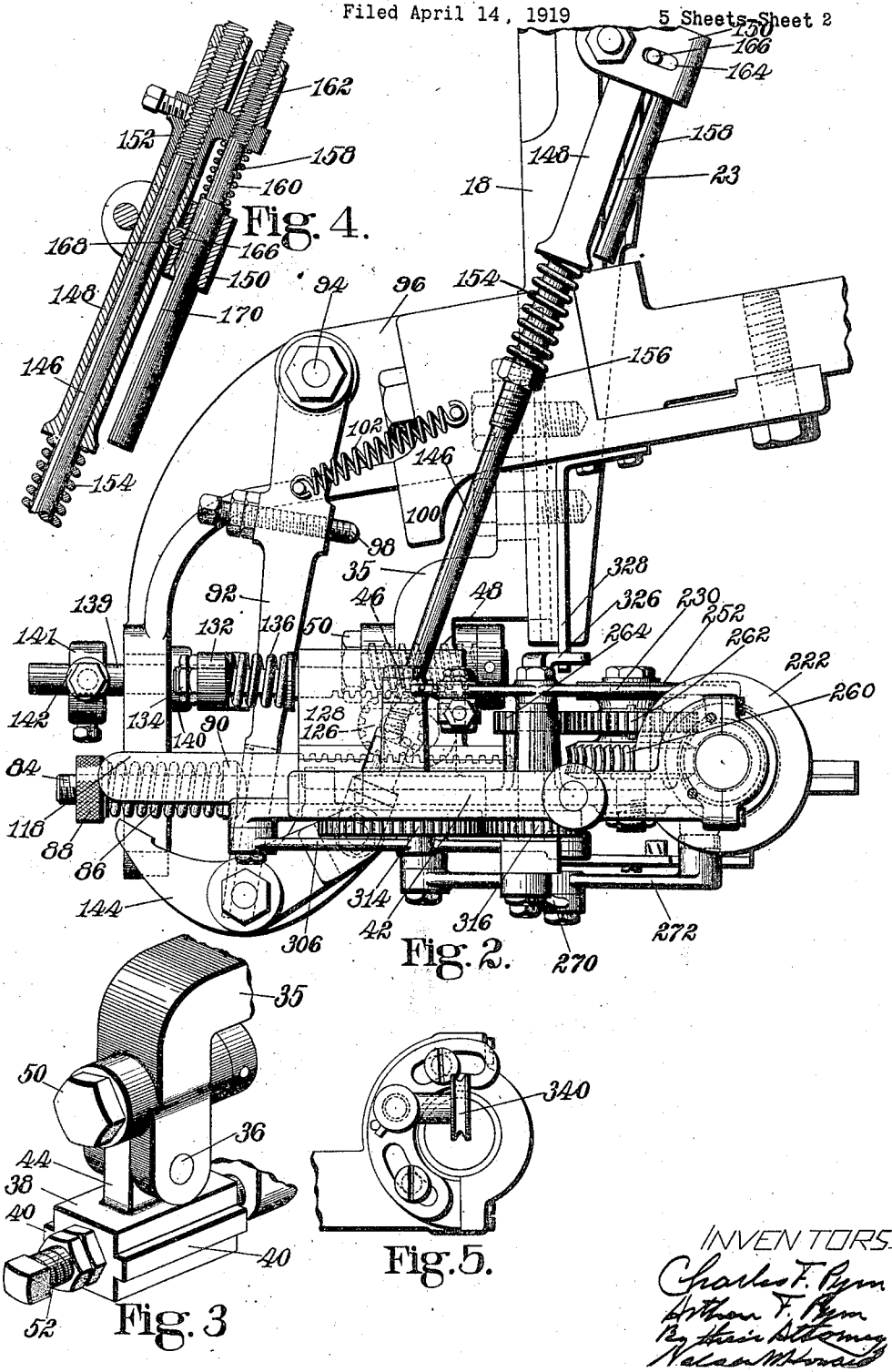

Feb. 5, 1924.                                          1,482,409
C. F. PYM ET AL
MACHINE FOR USE IN THE LASTING OF BOOTS AND SHOES
Filed April 14, 1919        5 Sheets-Sheet 3

INVENTORS

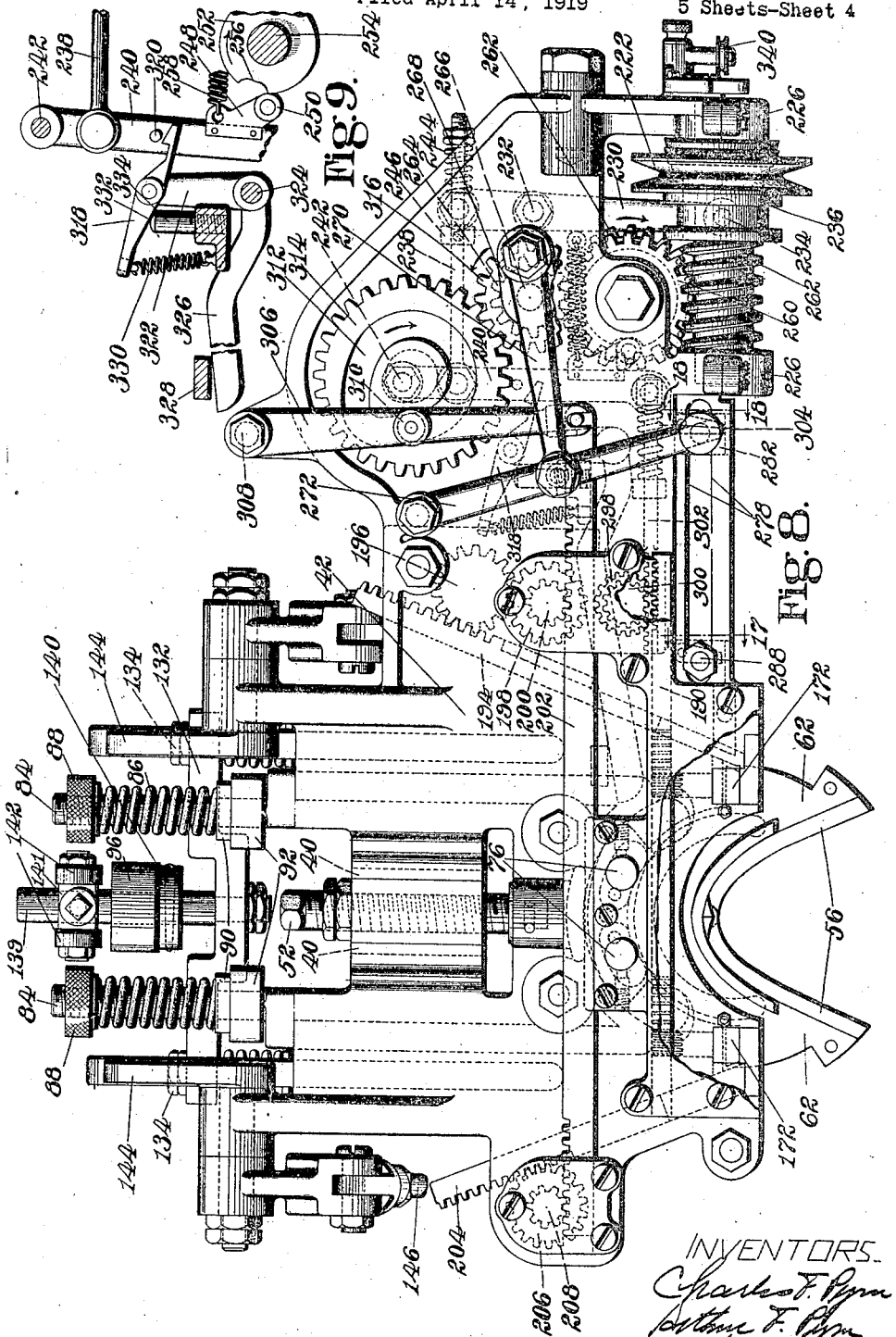

Feb. 5, 1924.
C. F. PYM ET AL
1,482,409
MACHINE FOR USE IN THE LASTING OF BOOTS AND SHOES
Filed April 14, 1919    5 Sheets-Sheet 5
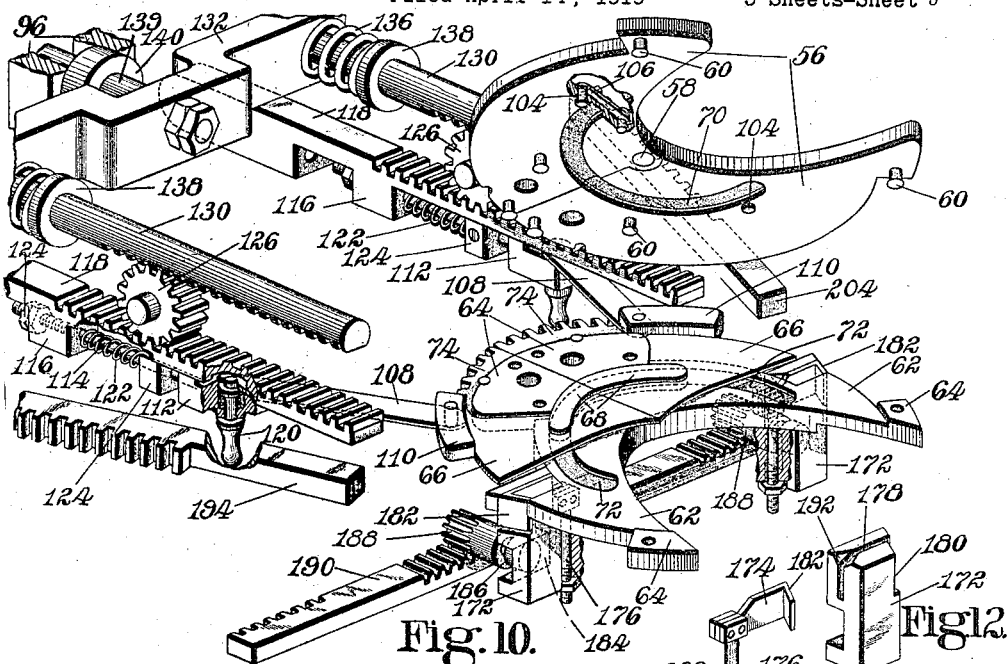
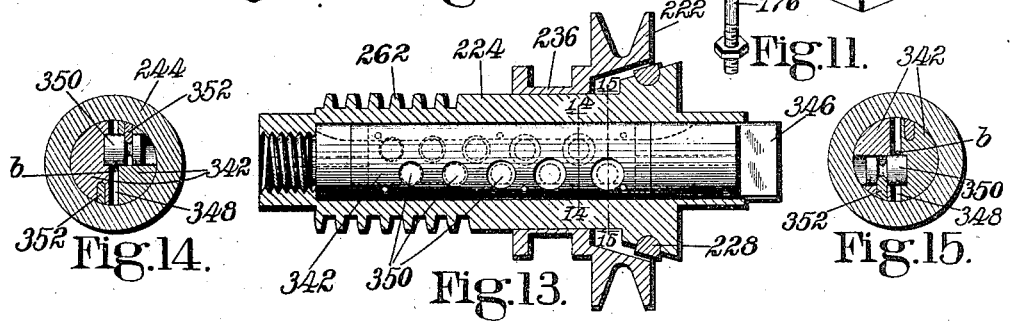
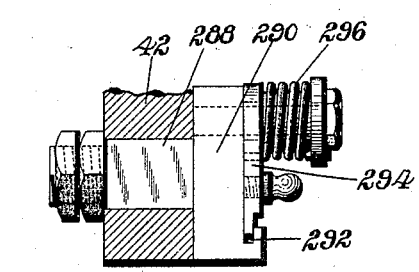
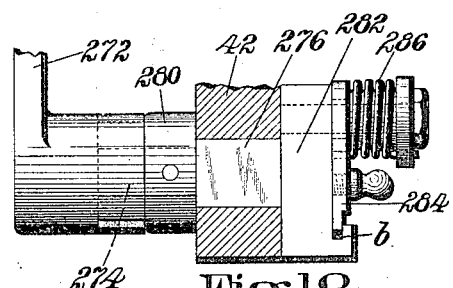

Patented Feb. 5, 1924.

1,482,409

UNITED STATES PATENT OFFICE.

CHARLES F. PYM AND ARTHUR F. PYM, OF LYNN, MASSACHUSETTS, ASSIGNORS TO UNITED SHOE MACHINERY CORPORATION, OF PATERSON, NEW JERSEY, A CORPORATION OF NEW JERSEY.

MACHINE FOR USE IN THE LASTING OF BOOTS AND SHOES.

Application filed April 14, 1919. Serial No. 289,898.

*To all whom it may concern:*

Be it known that we, CHARLES F. PYM and ARTHUR F. PYM, subjects of the King of England, residing at Lynn, in the county of Essex and State of Massachusetts, have invented certain Improvements in Machines for Use in the Lasting of Boots and Shoes, of which the following description, in connection with the accompanying drawings, is a specification, like reference characters on the drawings indicating like parts in the several figures.

This invention relates to machines for use in the manufacture of boots and shoes, and has more particular reference to that part of shoe manufacture wherein the upper is shaped to the contour of the last and is fastened in lasted position. An object of the invention is to provide improvements having to do particularly with the fastening of the upper, in order that this part of the lasting may be performed more expeditiously and satisfactorily and at less expense than heretofore.

In lasting the toe ends of various types of shoes, such as welt shoes and turn shoes, it is the common practice to fasten the upper in lasted position by means of a binder consisting usually of a strand of wire or similar material applied tightly round the end portion of the shoe and secured at the opposite sides of the shoe. While constructions have been devised heretofore to assist in performing this operation, and particularly to facilitate bending the binder round the shoe and securing it to the shoe, considerable time and labor on the part of the operator are still involved in presenting binder material for use upon each successive shoe. In one aspect, the present invention effects an important advance in the art by the provision of novel means for presenting binder material, or a binder, for use in the upper fastening operation. In the construction herein shown this is effected by means automatically operative in time relation to other operations performed by the machine, thus insuring the proper presentation of a binder without attention on the part of the operator. The illustrative construction comprises mechanism for feeding and severing a section of binder material of proper length to extend round the end of a shoe, with the section of material positioned in operative relation to means for applying it to the shoe.

A further important feature of the invention consists in novel means for preparing lasting binders for use on shoes, the illustrative construction comprising binder forming mechanism adapted to bend the ends of a section of binder material to form projections for use in fastening the binder to the shoe. In this aspect the present invention has important advantages as supplementing an earlier invention of Charles F. Pym covered by United States Letters Patent No. 1,436,194, granted on Nov. 21, 1922, disclosing means for applying a binder to a shoe and for securing it in place by forcing its ends into the shoe. In the machine herein shown, which includes in its organization many features of the construction shown in said earlier patent, the binder is formed with angled ends and is also positioned in operative relation to the binder applying means automatically, thus avoiding any delay incidental either to preparation or to presentation of the binder.

An advantageous characteristic of the automatic organization shown, embodying important features of the invention, resides in the provision for such control of the various instrumentalities as to cause a binder to be presented following the operation of the machine upon each shoe in preparation for its operation upon the next shoe, the illustrative machine having power driven binder forming means which is arranged to be rendered operative as an incident to the return of the lasting mechanism to starting position. With a view to compactness and simplicity in the construction and to facilitate the presentation of the binder to the binder applying means, the binder forming means in the illustrative machine is mounted for movement toward and from the shoe together with the mechanism provided for working the upper into lasted position and for applying the binder; and still other features of the invention are to be recognized in binder presenting means or binder forming means mounted for movement toward and from the shoe together with means for applying the binder to the shoe.

The above and other features of the invention, including novel binder applying mechanism and various details of construction and combinations of parts, will be described more fully with reference to the accompanying drawings and pointed out in the claims.

While the invention is herein shown as embodied in a machine having means for performing both pulling-over and toe lasting operations, including binder applying means embodying features of the disclosure of the prior patent above mentioned, and while novel and advantageous features of the invention are to be recognized in the improvements thus provided in such machines, it will be understood that in various novel aspects the invention is not limited to the type of machine illustrated. It will also be understood that the invention in its broader aspects is not limited in utility to the manufacture of any particular kind of shoe nor to embodiment in a machine organized both to produce and to apply lasting binders as herein shown.

In the drawings:—

Fig. 2 shows substantially in side elevation, although at a slightly different angle from the position of Fig. 1, a portion of the toe lasting wiper mechanism and of the means for forming a binder and applying it to the shoe;

Fig. 3 illustrates more clearly than Fig. 2 the manner in which the lasting mechanism is supported;

Fig. 4 is a sectional view of a portion of the mechanism shown in Fig. 2 for operating the binder applying means;

Fig. 5 is a detail view of a wire guiding device which is omitted from Fig. 2 for the sake of clearness in the illustration;

Fig. 8 is an inverted plan view of the mechanism shown in Fig. 6, including also connected portions of the wire feeding and binder forming means shown in Fig. 2;

Fig. 9 is a detail view of a portion of the controlling mechanism shown in Fig. 8 as the parts are positioned at a different stage in the cycle of operations;

Fig. 10 is an exploded view of the toe lasting wipers and associated portions of the mechanism for forming and applying the binder;

Figs. 11 and 12 illustrate details of the binder forming mechanism shown in Fig. 10;

Fig. 13 shows in section wire straightening mechanism with which the machine is provided and also a clutch through which the binder forming means is operated;

Figure 19:
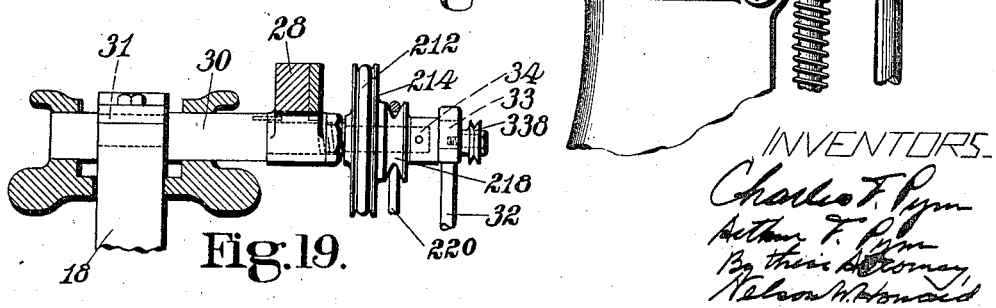

Figs. 14 and 15 are sectional views respectively on the lines 14—14 and 15—15 of Fig. 13;

Fig. 16 shows a portion of the wire straightening means as viewed from a different angle than in Fig. 13;

Figs. 17 and 18 are sectional views respectively on the lines 17 and 18 of Fig. 8; and Fig. 19 shows in front elevation and partly in section mechanism with which the machine is provided for imparting a compressing movement to the wipers, and including also a portion of the driving connections for the binder forming mechanism.

The machine in which the invention is herein shown as incorporated embodies in its general organization well known features of the type of pulling-over machine shown and described in detail in prior United State Letters Patent No. 1,029,387, granted on June 11, 1912, upon an application of R. F. McFeely, and in respect to the wiper mechanism and binder applying means, as hereinbefore stated, embodies also features described and claimed in the earlier patent of Charles F. Pym. These general characteristics of the machine therefore, in so far as they are not modified for the purposes of this invention, will be described herein only briefly, and for further information with reference to the construction of the illustrative type of machine reference may be made to said prior patents.

Figure 1:
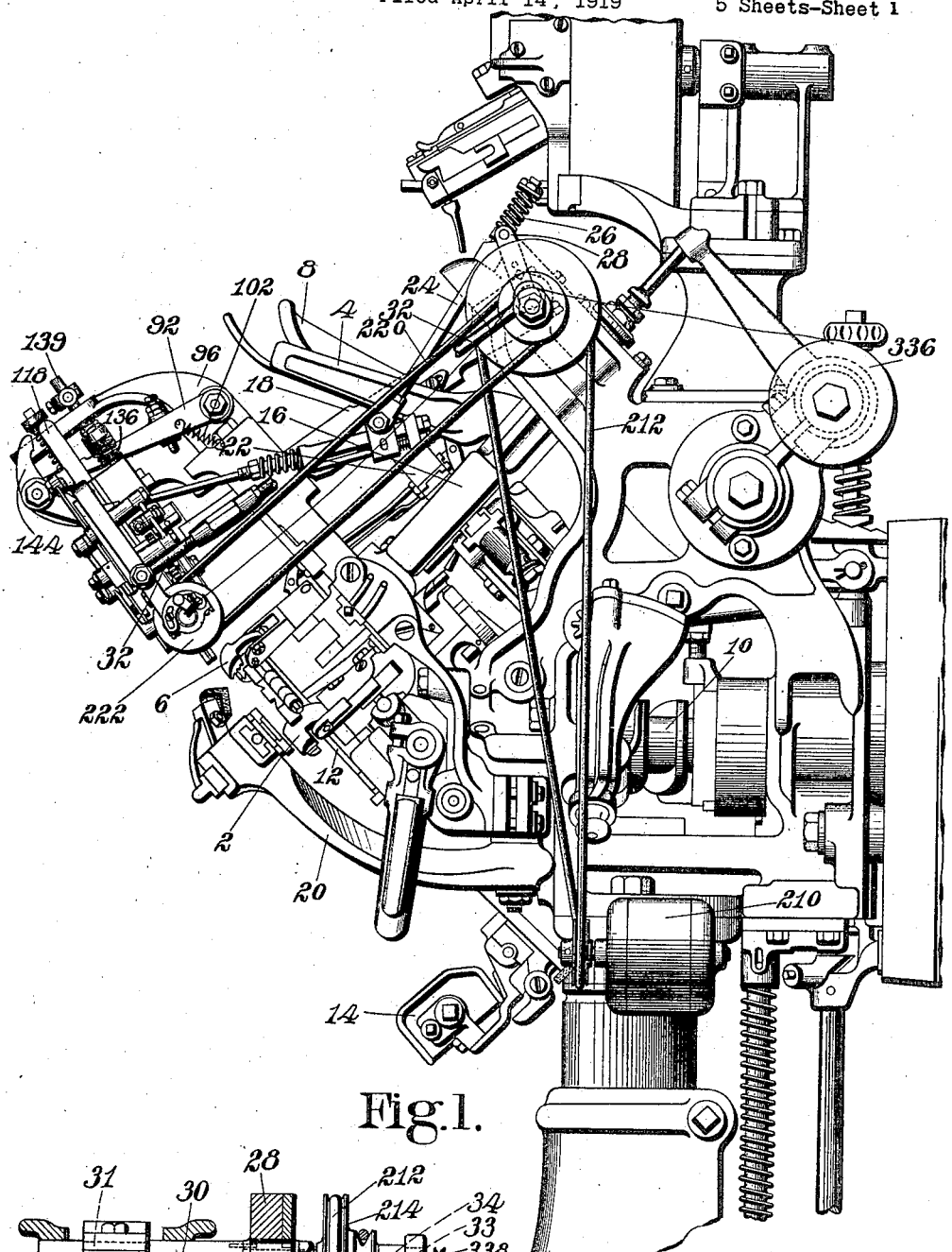
Figure 1 is a view in side elevation of the head portion of the illustrative machine.

In its general organization the machine includes side grippers 2 connected to updraw levers 4, a toe gripper 6 connected to an updraw lever 8, and a cam shaft 10 having yielding connections with said levers for imparting movement to the grippers to pull the upper of a shoe positioned relatively to the grippers by means of a sole rest, a portion of which is seen at 12 in Fig. 1, and a heel rest 14. The machine is also provided with mechanism carried by side arms 16 for laying or wiping the margin of the upper at the sides of the forepart over the bottom of the sole or insole and for driving fastening tacks, with toe lasting mechanism carried by a forwardly and rearwardly swinging front arm 18, and with side clamp arms 20 which are swung inwardly into operative relation to the shoe and carry means for pressing the upper against the lateral surface of the last and for supporting the forepart of the shoe against downward pressure in the lasting operation.

Machines of this type are provided with means for controlling the power driven movement of the various mechanisms to cause the machine to perform its operations in successive stages between which the machine is at rest. While the precise number of stops which the machine makes in its cycle of operations varies in practice and is, generally speaking, immaterial to the present invention, it will be assumed for purposes of explanation that the present machine performs its operations in two stages or steps, the parts coming automatically to rest immediately after the upper has been subjected to the pulling action of the grippers. At this point the operator is enabled to inspect the work and to make any of the numerous adjustments characteristic of machines of this type for the purpose of altering the tension of different portions of the upper, adjusting the forepart of the upper to position the tip line in the correct angular relation to the last, or otherwise correcting any inaccuracy which there may be in the manner in which the upper is positioned on the last. When the machine is again started the side clamp arms 20 are swung into supporting and holding relation to the shoe, and the side grippers are swung yieldingly inward to overdraw the upper, followed by the side arms 16 and the front arm 18 which as they move inward cause the side and toe grippers finally to release their hold upon the upper. As the side arms 16 continue their inward movement they serve by means of their supported overlaying and tacking mechanisms to wipe over and fasten the margin of the upper at the opposite sides of the forepart, and in the continued movement of the front arm 18 the mechanism carried thereby is caused to gather and wipe the toe portion of the upper into lasted position and to fasten it in such position by means of a wire binder the inturned ends of which are forced into the shoe, substantially as explained in the earlier Pym patent above mentioned. The rearward swinging movement of the arm 18, as in the construction shown in said patent, is effected by means of a slide 22 which is moved lengthwise to operate the arm and is mounted also for downward swinging movement whereby it serves to operate the binder applying mechanism, the outer end of the slide being connected to the arm by means including guide slots 23 in the arm (Fig. 2) to permit such movement. As in the earlier construction, also, the slide 22 is connected yieldingly through a rod 24 and a spring 26 to a crank arm 28 on a rock shaft 30 which carries an eccentric 31 upon which the front arm 18 is mounted, thus rendering the member 22 effective in its downward swinging movement to turn the eccentric and impart a short downward movement to the arm 18 to cause the wipers to press the overwiped upper stock upon the bottom of the sole. Connected to one side portion of the lasting mechanism is a rod 32 which serves as auxiliary supporting means, this rod being mounted on an eccentric 33 carried by a stud 34 fast on the end of the shaft 30 to cause the rod 32 to be moved with the arm 18 when the shaft 30 is turned. Following the overlaying and fastening operations the parts are returned to their starting positions and the shoe is released.

Figure 6:
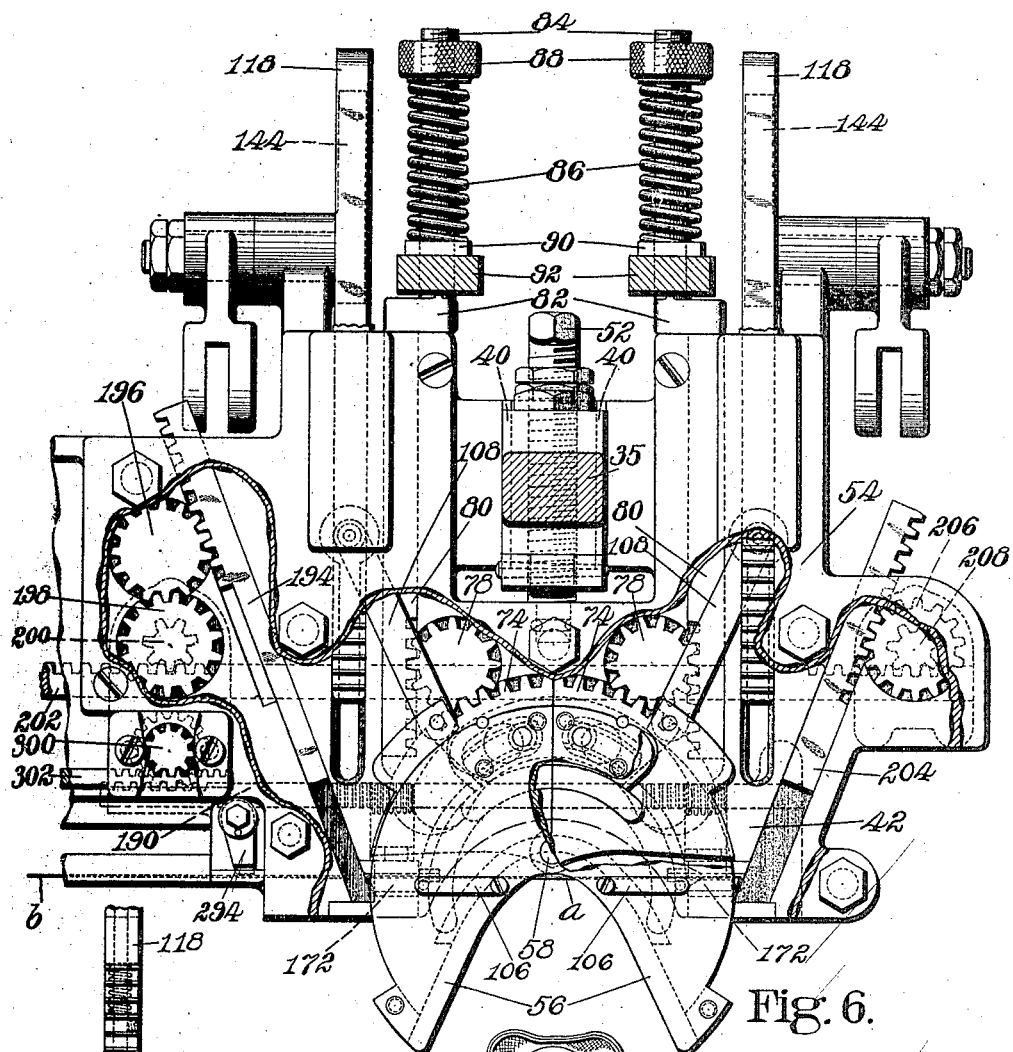
Fig. 6 is a plan view of a portion of the mechanism shown in Fig. 2, with parts broken away to illustrate the interior construction.

The toe lasting mechanism herein shown, which for the purposes of this invention is in many respects different in construction from that shown in said earlier patent, is mounted upon the front arm 18 by means of a bracket 35 which, as shown in Fig. 2, is adjustable lengthwise of the arm to raise or lower the toe lasting mechanism bodily relatively to the position of the shoe. Mounted on a pivot 36 (Fig. 3) in the lower end of the bracket 35 is a block 38 provided at its opposite sides with projecting tongues 40 which are arranged to engage slidingly in grooves formed in oppositely disposed portions of a casting 42, hereinafter termed the "wiper head," which supports the wipers and the means for forming and applying the binder. An upwardly projecting lug 44 on the block 38, whereby the block is mounted on the pivot 36, is formed at its upper end with teeth 46 in engagement with a worm 48 (Fig. 2) rotatably mounted in the bracket 35 and provided with an operating head 50 whereby the worm may be turned. Such turning movement of the worm 48 serves through the teeth 46 to swing the supporting block 38 in one direction or the other about the pivot 36 and thus to tilt the wiper head 42 for adjusting the wipers to the correct angular relation to the plane of the forepart of a shoe bottom. Threaded in the supporting block 38 is a screw 52 the front end of which has a swiveled connection with a portion of the wiper head 42, as shown in Figs. 6 and 8. By turning the screw 52 the wiper head and its supported mechanism may be adjusted slidingly along the tongues 40 on the block 38 in directions lengthwise of the shoe to determine a proper limit of overwiping movement of the wipers. It will thus be seen that the construction provides for three different adjustments of the wiper support, comprising a bodily movement in directions transverse to the plane of the shoe bottom by reason of the connection between the bracket 35 and the arm 18, a tilting movement about the pivot 36, and a movement lengthwise of the shoe along the supporting block 38.

As shown in Fig. 6, the toe lasting wipers are mounted in a segmental recess in the front part of the upper face of the wiper head 42 beneath a cover plate 54. As shown in detail in Fig. 10, the wipers in the present construction comprise a pair of plates 56 connected by an intermediate pivot 58 and secured by means of a plurality of pins 60 in fixed relation to a pair of underlying plates 62 which are arranged to engage the lateral periphery of the shoe round the toe end in substantial conformity to the contour of the shoe lengthwise of its bottom edge. As shown in Figs. 6 and 8, the inner edges of the plates 62 are positioned at a distance from the inner edges of the wipers substantially equal to the width of the feather of the sole or insole of the shoe, and the plates 62 may thus serve as means to limit positively the inward movement of the wipers while also assisting by their pressure against the shoe in forming the upper smoothly along the edge of the shoe bottom. Upraised portions 64 on the plates 62, in the parts of the plates engaged by the pins 60, serve to space the greater portion of the lower surface of these plates from the overlying wiper plates 56 a distance slightly greater than the thickness of a wire binder to be applied to the shoe. In the spaces thus provided are mounted a pair of plates 66, hereinafter termed "driver plates," for forcing the binder closely into holding engagement with the upper materials in the angle between the feather and the rib or shoulder of the sole or insole and for driving the inturned ends of the binder into the shoe, the front edges of these plates being curved for this purpose in substantial conformity to the curve of the front edges of the wiper plates 56. Curved ribs 68 formed on opposite sides of the driver plates engage in similarly curved guideways 70 and 72 formed respectively in the plates 56 and 62 to guide the driver plates in their operative movement. The wipers 56, their connected shoe engaging plates 62 and the driver plates 66 thus assembled are secured as a unit detachably upon gear segments 74 which are mounted within the segmental recesses in the wiper head to swing about an axis substantially coincident with the axis of the pivot 58 of the wiper plates. The means for adjustably connecting the wiper mechanism to the gear segments includes pins 76 (Fig. 8) and connected locking means similar to the construction described in the earlier patent.

For imparting operative movement to the gear segments 74, the wiper head carries pinions 78 which engage the teeth of the segments 74 and also teeth on rack bars 80 which are slidably mounted in the wiper head. At their outer ends the rack bars are provided with offset or shouldered portions 82 upon which are extension rods 84 encircled by springs 86 which bear at their outer ends upon tension adjusting nuts 88 and at their inner ends upon washers 90, these washers serving as bearing members between the springs and the lower slotted ends of swinging arms 92 which are pivotally mounted at 94 on a forwardly extending fixed bracket 96. These arms carry adjustable stop screws 98 which are arranged to be moved into engagement with fixed lugs 100 on the bracket 96 as the arm 18 and the wiper mechanism is swung toward the shoe, the arms 92 being connected to springs 102 which tend to swing them toward said lugs and thus to hold the rack bars normally at their inner limits of movement with the shoulders 82 in engagement with the wiper head. It will be evident that when the stops 98 engage the lugs 100 in the movement of the lasting mechanism toward the shoe the swinging movement of the arms 92 is stopped, and by reason of the comparatively strong tension of the springs 86 movement of the rack bars 80 is also stopped, thus causing the pinions 78 to turn in the continued forward movement of the wiper head and impart swinging movement to the gear segments for closing the wipers over the shoe. The closing movements of the respective wipers are so timed by adjustment of the stop screws 98 as to cause the wipers to begin to close over the opposite sides of the shoe substantially at the time when the intermediate portion of the wipers begins to advance over the end of the shoe. If for any reason, however, one of the wipers should encounter abnormal resistance prematurely, as for example by completing its overwiping operation and forcing the upper against the shoulder or rib of the sole or insole earlier than the other by reason of incorrect adjustment of the mechanism or of abnormal lateral displacement of the forepart of a shoe, the spring 86 affords provision for yield in response to pull of the connected rack bar 80 to permit the other wiper to continue its wiping movement after the swinging movement of the first wiper has ceased, and in case the lateral closing movement of both wipers is completed before the movement of the arm 18 and the wiper mechanism as a whole lengthwise of the shoe is stopped, both springs 86 may yield to permit such continued lengthwise movement without damage to the shoe.

The driver plates 66 in the machine shown are so constructed that when they are in their retracted position as shown in Figs. 6 and 10, in which position they are centralized by engagement with the upstanding projections 64 on the rear ends of the underlying plates 62, their front edges are so disposed relatively to the wipers and to the underlying plates as to permit a wire binder $a$, formed with angled ends by mechanism to be hereinafter described, to lie straight across the wipers in the position indicated in Fig. 6. In this position the binder is retained by pins 104 which are mounted on spring plates 106 on the wipers 56 and project through the wipers and substantially across the space in front of the driver plates 66 to prevent the binder from slipping prematurely out of place, the necessity for such retaining pins arising particularly from the fact that the lasting mechanism as a whole is inclined to the horizontal as shown in Fig. 1. The lower end of these pins are beveled slightly to permit them to be readily displaced by engagement with the binder and the driver plates when the latter are swung forward in their operative movement.

The operating connections to the driver plates 66 comprise links 108 pivotally connected at their front ends to lugs 110 on the outer rear edges of the plates and at their rear ends to blocks 112 which are fast on the front ends of rods 114 slidably mounted in lugs 116 on the lower sides of rack bars 118 which are mounted for lengthwise sliding movement in guideways in the wiper head. The connections between the links 108 and the blocks 112 comprise spring held pins 120 which may be moved lengthwise to permit the links to be detached from the blocks. Encircling the rods 114 are springs 122 which bear at one end upon the lugs 116 on the rack bars 118 and at their opposite ends upon blocks 124 which are fast on the rods 114. The springs 122 thus tend to force the rods 114 forwardly as far as permitted by adjustable nuts 125 on the rear ends of the rods and permit a relative yield between the rack bars and the links 108 the purpose of which will be hereinafter explained.

Engaging the teeth on the rack bars 118 are pinions 126 which are mounted in bearings in an upstanding projection 128 (Fig. 2) on the cover plate 54, and engaging these pinions on the opposite side from the rack bars 118 are upper rack bars 130 which are mounted slidably in bearings in the projection 128 on the cover plate. On their outer ends the rack bars 130 support a cross bar 132 through which they extend somewhat loosely, the connection between these parts permitting the rack bars, under some conditions, to move lengthwise relatively to the cross bar and each independently of the other. Nuts 134 (Fig. 8) on the outer ends of the rack bars 130 serve by engagement with the cross bar 132 to limit movement of the rack bars relatively to the cross bar in one direction, and on the opposite side of the cross bar from these nuts are springs 136 which engage collars 138 on the rack bars and tend to move these bars in a direction to hold the nuts 134 against the cross bar. At a point intermediate between its opposite ends the cross bar 132 has secured thereto a rod 139 which extends through an elongated slot in the lower end portion of the bracket 96. Secured to the rod 139 at the inner side of the bracket 96 is a stop collar 140 which is arranged to engage the bracket and thus to limit outward movement of the rod 139 and the cross bar 132 when the wiper head moves outwardly away from the shoe. The collar 140 in engagement with the bracket 96 thus determines the normal position of the rack bars 130 relatively to the wiper head and through the connections to the driver plates, comprising the pinions 126 and the lower rack bars 118 and links 108, normally holds the driver plates at their outer limits of movement in which their outer edges are substantially in engagement with each other and with the upstanding projections 64 on the rear ends of the plates 62.

Figure 7:
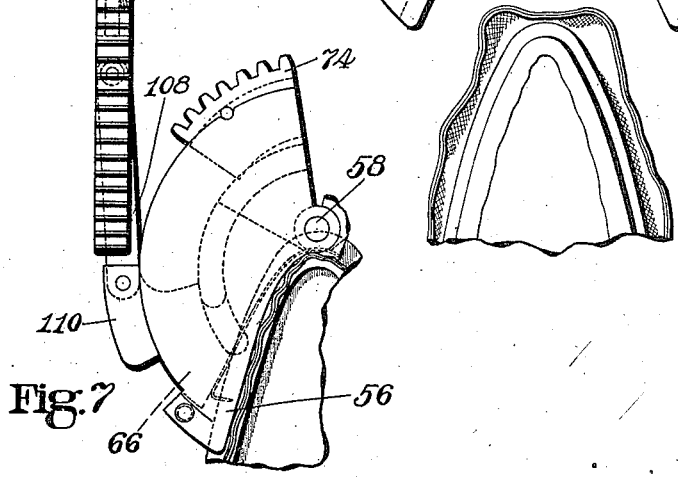
Fig. 7 is a detail view of a portion of the mechanism shown in Fig. 6, illustrating the application of the binder to the shoe and showing the parts at an intermediate stage in their operative movement.

Adjustably secured on the rod 139 on the opposite side of the bracket 96 from the collar 140 is a block 141 which carries rolls 142 adapted to engage the bracket 96 to restrain the rod 139 and its connected rack bars 130 from forward movement with the wiper head, the rolls 142 being provided to avoid friction as the rod 139 and the block 141 are carried downwardly lengthwise of the slot in the bracket 96 in response to the swinging movement of the wiper head. When the parts are in their starting position the rolls 142 are preferably spaced forwardly from the adjacent face of the bracket 96, as shown, the space between these rolls and the bracket, however, being somewhat less than the space between the stop screws 98 on the wiper controlling arms 92 and the co-operating stop lugs 100. By reason of this construction no relative closing movement either of the wipers or of the driver plates is effected during the initial portion of the movement of the lasting mechanism toward the shoe. As soon, however, as the rolls 142 are carried into engagement with the bracket 96 the lengthwise movement of the rod 139 is stopped and through the cross bar 132 the connected rack bars 130 are held from lengthwise movement during the continued forward movement of the wiper head. The rack bars 130 thus become effective during the continued forward movement of the wiper head to cause the pinions 126 to turn and impart forward movement to the lower rack bars 118, thereby swinging the driver plates 66 forwardly and inwardly in the paths determined by the engagement of their projections 68 in the curved slots 70 and 72, such movement being imparted to the driver plates through the springs 122 which are of sufficient strength to prevent them from yielding against the normal resistance encountered at this time. This movement of the driver plates, by reason of the smaller space between the rolls 142 and the bracket 96 than between the stop screws 98 and the lugs 100, preferably begins slightly prior to the beginning of the closing movement of the wipers for a purpose which will be hereinafter explained, and the movement of the driver plates continues during the entire closing movement of the wipers and their forward bodily movement over the end of the shoe. In this closing movement of the driver plates the opposite halves of the binder are bent inwardly toward the sides of the shoe and round the end of the shoe, the intermediate portion of the binder being forced over the shoe bottom toward its holding position at the end of the shoe by the action of the edges of the driver plates as the wipers advance. It will be noted that in starting position the inner front corners of the driver plates 66 are between the wiper edges and the edges of the plates 62, this arrangement being due partly to the necessity for retracting the driver plates sufficiently to permit the binder to extend straight across the wipers. The curve of the slots 70, 72 is about an axis which is in front of the intermediate portion of the edges of the wipers 56, i. e. between the wiper edges and the shoe as the parts are viewed in Fig. 6 and consequently as the driver plates close the adjacent portions of their front edges have an advancing movement, the driver plates thus approaching a position in which their front edges are substantially flush with the front edges of the wipers throughout their length, as will be understood by reference to Fig. 7. This figure shows the positions of the parts substantially at the end of the forward movement of the wiper head, with the wipers closed over the shoe bottom and the front edges of the underlying plates 62 engaging the shoe round its lateral periphery. In this position the wipers hold the margin of the upper closely in the angle between the feather and the shoulder or rib of the sole or insole. It will be noted, however, that at this stage the opposite halves of the binder have not been forced completely into holding relation to the lasted upper and that the ends of the binder have not been forced into the shoe materials, but that the lugs 110 on the driver plates have been swung round to a position in which they are opposite to the ends of the rack bars 118.

For the purpose of completing the operative movement of the driver plates 66 the machine is provided with additional mechanism comprising levers 144 which are pivoted on the wiper head and are arranged to engage the rear ends of the rack bars 118 in the forward position which these bars assume through the operation of the pinions 126 as above described and to force the bars farther forwardly. In this final forward movement of the bars 118 the springs 122 are compressed by reason of the resistance which the binder opposes to the continued movement of the driver plates, and the ends of the bars 118 are thus carried into engagement with the lugs 110 to impart an inward thrust to the driver plates for forcing the binder closely against the upstanding margin of the upper and for driving the ends of the binder into the shoe to anchor the binder in place. It will be evident that the final movement thus imparted to the rack bars 118 by the levers 144 necessarily causes the pinions 126 to turn in a direction to force the upper rack bars 130 outwardly. Such outward movement of these rack bars may or may not be of sufficient extent to carry the collar 140 on the rod 139 into engagement with the bracket 96. In case such engagement is effected and movement of the cross bar 132 stopped thereby, the final portion of the movement of the rack bars is effected relatively to the cross bar against the tension of the springs 136 which yield to permit such movement. In case, moreover, the shape or position of the shoe is such that one of the driver plates completes its operative movement before the other and its connected rack bars are brought to a stop by the resistance thus encountered, the connection between the cross bar 132 and the opposite rack bar 130 permits the latter to continue its backward movement against the force of its spring 136 independently of the operating connections at the other end of the cross bar.

The operative movement of the levers 144 is effected by the downward swinging movement of the slide 22 which takes place after its lengthwise backward movement whereby the arm 18 and its supported lasting mechanism are swung toward the shoe, as explained more in detail in the earlier application hereinbefore referred to, the connections between this slide and the levers being similar to the connections whereby the driver plates are operated in the construction shown in said earlier application. Specifically in the present construction these connections, as shown in detail in Figs. 2 and 4, comprise in each instance a rod 146 pivotally connected to the lever 144 and extending through a sleeve 148 which projects within a recess in a block 150 pivotally connected to the slide 22. On the outer end of the rod 146 is secured adjustably a bracket 152 against which the end of the sleeve 148 abuts and in contact with which the sleeve is normally held by a spring 154, the spring abutting at its lower end against a nut 156 on the rod 146. In the bracket 152 is slidably mounted a short rod 158 which has a diametrically enlarged portion mounted for sliding movement in a bearing in the block 150. A spring 160 abutting against the enlarged portion of the rod 158 tends to force the rod downwardly with respect to the bracket 152 as far as permitted by an adjustable stop 162 on the end of the rod. Mounted in a slot 164 in the block 150 is a clutch roll 166 which in the normal relation of the parts shown in Figs. 2 and 4 is arranged to engage in a recess 168 in the side of the sleeve 148 and thus to lock the sleeve against lengthwise movement relatively to the block 150, the roll being held in locking position by engagement with the enlarged portion of the rod 158. On the side toward the roll this enlarged portion of the rod is cut away for a considerable distance from its outer end, as shown at 170. In the operation of this mechanism downward movement is imparted to the rod 146 to operate lever 144 through the clutch roll 166, sleeve 148 and spring 154, the spring being of sufficient strength to prevent it from yielding except in response to such abnormal resistance as that encountered when the driver plate 66 has been forced to its inward limit of movement against the shoe. When such limit is reached the spring yields and any continued downward movement of the operating member 22 causes the sleeve 148 to slide along the rod 146 until the clutch roll 166 drops into the recess 170 in the rod 158, whereupon operative connection between the block 150 and the sleeve is broken and the sleeve is permitted to slide back into engagment with the stop bracket 152 under the influence of the spring 154. As the operating member 22 is swung backwardly to its starting position the clutch roll 166 by engagement with the enlarged portion of the rod 158 pushes the rod upwardy against the tension of the spring 160 until the roll arrives in position to enter the recess 168 in the sleeve 148, whereupon the rod 158 is released and permitted to resume its normal position.

It will be evident that the construction above described, comprising the separate connections to the respective levers 144 and the provision for yield of the respective springs 154 only in response to such resistance as that encountered when the angled end of the wire binder has been forced fully to its final holding position, insures that both ends of the binder shall be fully driven into the shoe and the binder forced against the shoe at the opposite sides with substantially equal pressures irrespective of the shape or position of the shoe. When the connection between either of the levers 144 and the operating member 22 is broken by the action of the clutch mechanism shown in Fig. 4, as hereinbefore explained, the corresponding rack bar 118 is released substantially from pressure of the lever against it. In case the spring 136 on the connected rack bar 130 was compressed in the operative movement of the driver plates, it is now permitted to expand and to return the rack bar 130 to its normal position relatively to the cross bar 132, the connected rack bar 118 being forced outward slightly in consequence of such reaction. Release of the rack bars 118 by the levers 144 also permits the rack bars 118 to resume their normal relation to the lugs 110 on the driver plates 70 through the expansion of the springs 122. As the wiper head is swung outwardly in the return of the parts to starting position, the collar 140 by engagement with the bracket 96 holds the rack bars 130 against lengthwise movement and causes the lower bars 118 to be forced outwardly by the pinions 126, thereby swinging the driver plates 66 back to their starting position, as shown in Fig. 10. At the same time the wipers 56 and the plates 62 are returned to their normal position by the action of their operating mechanism, as will be fully understood from the detailed description of these parts.

As hereinbefore stated, the driver plates 66 in their closing movement swing about an axis which is in front of the intermediate portion of the edges of the wipers and consequently in front of the inner adjacent portions of the binder engaging edges of these plates. By reason of this construction a relative separation of the inner front corners of the driver plates takes place as the plates are swung inwardly toward the shoe (see Fig. 7), and the plates thus have a bodily sliding movement along the binder and relatively to the wipers as they force the binder inwardly against the shoe and drive the ends into the shoe. Such movement of the driver plates relatively to the binder is of advantage as tending to tighten the binder rearwardly and to give it a slight rearward movement at the opposite sides of the shoe after the points of the inturned ends have entered the shoe materials as further insurance that the inturned ends shall project forward relatively to the body portion of the binder in such manner as to act as hooks with a tendency to prevent disengagement of the binder from the shoe by reaction of the shoe materials.

The binder $a$ is formed in the position in which it is shown in Fig. 6, in which, as hereinbefore explained, it extends straight across the wipers, the angled ends of the binder pointing forwardly. The binder forming means includes die blocks or formers 172 (Fig. 10) which are slidably mounted on guides 174 secured by bolts 176 to a fixed portion of the wiper head, the die blocks being thus positioned in arcuate recesses formed in the outer sides of the lower plates 62 of the wiper mechanism and arranged to present front faces against which portions of these plates abut when the wipers are in their open or normal position, as shown in Fig. 10, to provide an uninterrupted surface over which the ends of the binder may slide in the initial portion of their movement toward the shoe prior to the beginning of the inward closing movement of the plates 62 and the wipers. The die blocks 172 are each provided with an intermediate slot 178 to receive the shank portion of the guide 174, and with an outer recess or slot 180 to receive the inturned end 182 of the guide, a portion of the die block thus being shaped complementally to the shape of the guide. The upper edges of the guides 174 lie at all times substantially flush with the plane of the upper surface of the plates 62. The dies 172, however, are permitted to slide upwardly over the guides across the space between the plates 62 and the overlying wiper plates, and when they are thus positioned the portions of the slots 178 above the guides 174 are presented to receive the binder wire and permit its ends to be bent in the required shape into the upper portions of the slots 180. For moving the die blocks upwardly and downwardly at the required times they are provided with transverse guideways in which are mounted sliding blocks 184 operated by eccentrics 186 on the ends of pinions 188 which are mounted to turn in bearings in the wiper head, these pinions being operatively engaged by rack teeth on a bar 190 which is operated by connections to be hereinafter described. It will be understood that the die blocks are moved upward substantially into engagement with the overlying wipers to receive the wire and permit the binder to be formed, and are then moved downwardly to position their upper ends substantially flush with the upper edges of the guides 174 and the surface of the plates 62, thus leaving the formed binder in front of the driver plates 66 in position to be engaged by these plates and applied to the shoe. As hereinbefore explained, the relative adjustment of the block 141 and of the stop screws 98 is such as to cause the driver plates to begin their closing movement before the wipers and the plates 62 begin to close, one object of this arrangement being to cause the end portions of the binder to be advanced along the plates 62 beyond the junction between these plates and the front faces of the die blocks before any relative separation takes place at this junction point and thus to avoid any possibility that the ends of the binder may catch on the rear edges of the abutting portions of the plates 62.

While the die blocks 172 are presented in their uppermost position in front of the driver plates 66, a length of binder wire is fed across the wiper mechanism from one side to the other through the upper portions of the slots 178 in the blocks by means which will be hereinafter described in detail, the feed being stopped when the end of the wire projects beyond the farther die block a distance equal to the desired length of the inturned end of the binder. In order to insure that the end of the wire shall enter the farther die block as it advances across the mechanism this block is beveled as indicated at 192 (Fig. 12) at one end of the slot 178. After the wire has been thus fed, the desired length is cut off by means of a shearing member 194 slidably mounted in a guideway in the wiper head and provided at its outer end with teeth operatively engaged by a pinion 196 driven in turn by a pinion 198. Fast with the pinion 198 is a smaller pinion 200 engaged by teeth on an operating bar 202 slidably mounted in the wiper head. Movement of the bar 202 toward the right in Fig. 6 serves through the pinion 198 and the idle pinion 196 to force the bar 194 ahead and in co-operation with the wire guide to cut off the wire. Continuing its forward movement, the bar 194 serves to bend that portion of the wire which projects beyond the outer edge of the associated die block 172 into the recess in the block above the edge of the inturned end 182 of the guide 174. Simultaneously with the forward movement of the bar 194, a similar bar 204 at the opposite side of the mechanism is moved forwardly by means of a pinion 206 operated from the transverse bar 202 through a smaller pinion 208, the bar 204 serving to bend into the co-operating recess in the die block at that side of the mechanism that portion of the wire which projects into its path of movement. The bars 194 and 204 are directed in paths which are inclined to the lengthwise dimension of the wire binder at the same angle as the inturned ends 182 of the guides 174 and the co-operating faces of the recesses 180 in the die blocks, to cause the inturned ends of the binder to project relatively to the lengthwise dimension of the binder at angles which are slightly less than right angles to insure that the ends of the binder shall hold effectively in the shoe as explained in the earlier patent hereinbefore mentioned.

The mechanism for feeding the wire and for forming the binder are operated in the construction herein shown by power driving means which is independent of the drive for the pulling-over and wiper mechanism, although if desired power for operating all these mechanisms may of course be derived from the same unitary source. In the illustrative construction there is mounted on the frame of the machine a continuously driven electric motor 210 connected by a belt 212 to an idle pulley 214 mounted on the stud 34 on the end of the shaft 30 on which the front arm 18 is mounted, the pulley 214 having fast thereon a smaller pulley 218 connected by a belt 220 to a pulley 222 mounted loosely on a sleeve 224 (Fig. 13) which rotates in bearings 226 in the wiper head 42. The pulley 222 is constructed to serve as a clutch member in co-operation with an inner friction clutch member 228 on the sleeve 224. A lever 230 (Fig. 8) pivoted on a stud 232 on the wiper head carries at one end a stud 234 which engages in a groove 236 in the hub of the pulley 222 and at its opposite end is connected by a rod 238 to a second lever 240 pivoted on a stud 242 in the wiper head. The connnection between the rod 238 and the lever 230 is yieldable against the force of a spring 224 which bears between the lever and nuts on the end of the rod 238 and permits the rod to slide relatively to the lever while bringing pressure to bear thereon to force the clutch member 222 yieldingly against the co-operating member 228, the normal relation between the rod 238 and the lever 230 being determined by a stop collar 246 on the rod. The lever 240 carries a bracket 248 (Fig. 9) which supports a roll 250 for engagement with the periphery of a controlling member 252 mounted fast on a rotatable stud 254, this member having a peripheral recess 256 in which the roll is normally received and in which it is held by means of a spring 258 connected to the bracket 248. When the parts are thus positioned, the rod 238 is forced toward the right (Figs. 8 and 9) and thus causes the lever 230 to hold the clutch member 222 out of engagement with the member 228. Fast on the stud 254 is also a worm gear 260 which has operative engagement with a worm 262 formed on the sleeve 224. When the lever 240 is moved toward the left to the position shown in Fig. 9, thereby withdrawing the roll 250 from the recess 256, the clutch member 222 is caused to engage the member 228 yieldingly under the tension of the spring 244 and thus to transmit rotary movement to the sleeve 224, turning the worm gear 260 and the parts connected therewith including the controlling member 252. The driving connection between the two parts of the clutch is thus maintained until the member 252 has made a single revolution and permits the roll 250 to drop back into the recess 256, whereupon the lever 230 is operated through the rod 238 to disconnect the parts of the clutch and cause rotation of the worm gear 260 and the movement of the connected parts to cease.

Mounted on the stud 254 and fast with the worm gear 260 is a pinion 263 which has operative engagement with a pinion 264 fast on a rotatable stud 266 on the wiper head, the pinion 264 having half as many teeth as the pinion 263 to cause it to make two revolutions to each revolution of the latter pinion. The stud 266 carries a crank arm 268 connected by a pitman 270 to a lever 272 which is pivoted on the wiper head and is slidably connected at its outer end to a stud 274 (Fig. 18) having a rectangular portion 276 arranged to slide along a guideway 278 in the wiper head. On one side of the portion of the wiper head in which the guideway 278 is formed the stud 274 carries a collar 280, and on the opposite side of the guideway it carries a block 282 having a laterally offset portion recessed, as shown in Fig. 18, to receive and guide the binder wire b. Pivoted on the block 282 is a pawl 284 which is operated upon by a spring 286 to hold its outer toothed end in engagement with the wire in the guiding recess. The block 282 receives wire feeding movement when the lever 272 moves toward the left, as the parts are viewed in Fig. 8, the pawl 284 being so inclined as to cause it to grip the wire firmly during movement of the block in this direction and to yield as the block is moved in the reverse direction. At the front end of the guideway is secured a stud 288 provided with a block 290 (Fig. 17) shaped substantially like the movable block 282 with a recess 292 to receive and guide the wire, and mounted on this block is a pawl 294 operated upon by a spring 296 and so disposed as to grip the wire and prevent it from being pulled back in the reverse movement of the feed block 282 while permitting it to be fed forward freely. The ratio of the pinions 263, 264 causes two successive forward feeding movements and two reverse movements to be imparted to the feed block 282 before the feeding and binder forming mechanisms are brought automatically to rest upon engagement of the roll 250 in the recess 256 of the controlling member 252, the wire being advanced exactly to the position required for forming the binder at the end of the second feeding movement.

Prior to the beginning of the feeding movement of the wire, the die blocks 172 are moved up across the space in front of the driver plates 66, as hereinbefore explained, in position to present the upper portions of their slots 178 in readiness to receive the wire as it is fed forward. To impart such movement to the die blocks through the pinions 188 and the eccentrics 186, the rack bar 190 is connected at its outer end to a pinion 298 which is fast with a smaller pinion 300 connected in turn to a shorter rack bar 302 which is connected at its outer end to the lever 240 hereinbefore described, the connection between this lever and the bar 302 being yielding in one direction against the force of a spring 304. It will now be evident that when the lever 240 is moved initially to withdraw the roll 250 from the recess 256 for setting the mechanism in motion, movement is imparted directly thereby through the rack bar 302 and the pinions 298 and 300 to the bar 190 for moving the die blocks 172 up into operative position, the spring 304 yielding in response to any excess movement of the lever 240 after the die blocks have engaged the wipers 56.

After the wire has been fed fully forward by the two feeding movements of the feed block 282 and during the final reverse movement of the feed block, that is, during the final quarter revolution of the worm gear 260, movement is imparted to the rack bar 202 to operate the wire cutting and bending slide 194 and the wire bending slide 204. For this purpose the rack bar is connected at one end to a lever 306 pivoted at 308 on the wiper head and provided intermediate between its ends with a roll 310 which engages in a cam groove 312 in a pinion 314, this pinion being connected to a pinion 316 fast on the stud 266 which is driven by the worm gear 260 through the connections hereinbefore described, the connections to the pinion 314 being so constructed that this pinion is driven at the same rate of speed as the worm gear 260 and makes one revolution to each revolution of the latter. The bar 202 is thus moved forward to operate the bending slides and immediately returned to its starting position as the parts of the mechanism are brought to rest, the die blocks 172 being also moved downwardly to their inoperative position after the binder has been formed in consequence of reverse movement of the lever 240 as the roll 250 reengages in the recess 256. The binder fully formed is thus left in position in the wiper mechanism ready to be applied to the shoe by the action of the driver plates.

The lever 240 is operated automatically to connect the two parts of the friction clutch and thus to initiate the movement of the mechanism for feeding the wire and forming the binder by a tripping device which is rendered operative as the wiper mechanism and the arm 18 approach their outer limit of movement in the return of the parts to starting position after operating upon a shoe. This device comprises a lever 318 having a hooked end to engage a pin 320 on the lever 240 and pivotally mounted on an arm 322 which is fast on a rock shaft 324, this shaft having also fast thereon a lever arm 326 which is arranged to be carried into engagement with a fixed stop 328 as the wiper mechanism approaches its normal position of rest. A spring 330 connected to the lever 318 tends to swing it in a direction to permit its hooked end to engage the pin 320 and also through the wedging action of an inclined face 332 on the lever in engagement with a fixed pin 334 to cause the arm 322 to be swung toward the right (Fig. 9) when movement of the arm 326 away from the stop 328 permits such movement. When the arm 18 and its supported lasting mechanism are swung toward the shoe the arm 326 is released from engagement with the stop 328 and the spring 330 is permitted to act to swing the arm 322 in the manner above described and to swing the lever 318 relatively to the arm to cause the outer end of the lever to hook over the pin 320. As the wiper mechanism now returns to its starting position the lever 326 is operated by engagement with the stop 328 to cause the arm 322 to swing reversely and through the hooked lever 318 and the pin 320 to pull upon the lever 240 in such manner as to disengage the roll 250 from the recess 256, at the same time connecting the parts of the clutch. Before the wiper mechanism arrives at its outer position of rest the action of the pin 334 upon the inclined face of the lever 318 in consequence of the movement of the arm 322 serves to tip the lever sufficiently to disengage its hooked end from the pin 320. Before this point is reached, however, the controlling member 252 has been turned sufficiently by power from its starting position to oppose its concentric peripheral surface to the roll 250 and thus to prevent disengagement of the parts of the clutch until the complete cycle of operative movements of the mechanism has been effected.

The wire for forming the binders is supplied from a reel 336 mounted in any convenient location on the frame of the machine, for example, as shown in Fig. 1, the wire being guided over an idle pulley 338 supported on the eccentric 33 with its axis coincident with the axis of the shaft 30, and thence extending downwardly over another guide pulley 340 secured on the wiper head opposite to the end of the rotatable sleeve 224. From this point the wire passes through straightening mechanism which is mounted within the sleeve 224 and is provided for the purpose of removing any kinks from the wire and of obviating any tendency which the wire may have to curl in one direction or another, in order to insure that in the subsequent feed of the wire its leading end shall be directed exactly as required across the wiper mechanism and within the slot in the farther die block 172. The straightening mechanism, as shown in Figs. 13 to 16 inclusive, comprises a cylindrical element 342 which has a threaded end 344 for securing it within the sleeve 224 and at its opposite end is provided with a rectangular projection 346 to be engaged by a wrench. The cylindrical member 342 is made up of two half sections which are relatively separable and, as shown in Fig. 16, are cut away on their opposed surfaces for a portion of their length to provide an intermediate slot 348. In the portions of the half sections of the member 342 in which this slot is located are mounted two sets or series of rolls 350, one set of these rolls, comprising those which are substantially on one side of the axis of the sleeve 224, being secured rotatably in one of the half sections of the member 342 and the other set, comprising the rolls positioned substantially on the opposite side of said axis, being secured rotatably in the other half section. As shown in Figs. 14 and 15, the rolls of each set are slotted circumferentially to receive a key 352 which extends lengthwise of the cylindrical member and is arranged to hold the rolls in place in their sockets. As shown in Figs. 14 and 15, moreover, the rolls are further supported by engagement in shallow cylindrical recesses in the faces of the opposed sections. By reference to Fig. 13 it will be seen that the two sets of rolls are arranged in staggered relation, the rolls of one set being opposite to the intervals between the rolls of the other set, and that the rolls of each set progressively decrease in diameter in the direction in which the wire is fed. It will also be seen that the peripheries of the larger rolls, which are nearest to that end of the sleeve at which the wire enters, project slightly beyond the axis of the sleeve or the general line of feed of the material, the extent of such projection decreasing as successive rolls are encountered in the direction of the feed and the smaller rolls near the opposite end of the sleeve being so arranged that the wire is permitted to be drawn substantially straight between them. It will be understood that during the feed of the wire, effected by the action of the block 282, the wire is pulled through the straightening mechanism between the two sets of rolls which at this time are being carried rapidly round and round the wire, and that by bending every portion of the wire in all directions a progressively decreasing distance as it is pulled forward the rolls serve to equalize all stresses tending to cause the wire to bend from a straight line and to leave it substantially straight without any tendency to deviate from its proper path of movement as it is finally fed forward across the wiper mechanism and to the slots in the die blocks. It will be understood that until the entire length of wire on the reel is used up the wire is always left in position within the bending and feeding mechanism with its end portion extending at least as far forwardly as the path of movement of the bending and cutting slide 194. When it is necessary to substitute a new reel of wire, the straightening mechanism may be removed from the sleeve 224 by unscrewing it, whereupon its two halves may be readily separated from each other and then clamped over the end portion of the new strand of wire. The straightening mechanism is then screwed back into the sleeve 224 and the end of the wire is drawn forwardly through the feed block 282 and the retaining pawl 294 until its forward end is positioned in the right location to begin the feed. If it is deemed advisable, the clutch 224, 228 may be actuated one or more times by hand to cause the feeding and forming mechanisms to go through their series of movements until wire acted upon by the straightening mechanism has been advanced into position to enter the die blocks.

Since the manner of operation of the various mechanisms has been explained in detail in connection with the description of their construction, it remains only to recapitulate briefly the series of operations of the machine as a whole. As hereinbefore explained, as the machine stands at rest ready to receive the shoe, a wire binder with angled ends is positioned as shown in Fig. 6 in readiness to be applied to the shoe, the binder being retained in such position by the pins 104, and as the parts are thus positioned at rest the clutch pulley 222 is driven idly through its connections to the motor 210. The operator presents an assembled shoe to the machine in the usual manner, arranging the margin of the upper within the open jaws of the grippers, and then trips the machine clutch to cause the updraw movement of the grippers to be effected, after which the machine comes automatically to rest with the upper under tension. Having made any of the usual adjustments of the upper which may be required by means of the various mechanisms provided for the purpose in machines of this type, the operator again trips the clutch to cause the remaining operations upon the shoe to be effected. As the machine again starts, the side clamp arms 20 are swung into supporting and holding engagement with the shoe, and immediately thereafter the side grippers are carried yieldingly inward over the shoe bottom to overdraw the upper, followed by the side tacker arms 16, the front arm 18 and the lasting mechanism also starting to swing toward the shoe. In the continued movement of these parts the toe and side grippers are tripped and caused to release the upper, the margin of the upper is wiped over the insole at the sides of the forepart and tacked, and the toe lasting wipers are closed round the shoe and over the shoe bottom in the manner hereinbefore explained, the underlying plates 62 which are fast with the wipers being carried into engagement with the lateral periphery of the shoe to assist in shaping the upper adjacent to the shoe bottom and also to serve as guides for the wire binder. As the wipers are advanced toward the shoe, the intermediate portion of the binder is forced over the shoe bottom at the extreme end of the shoe by the action of the inner adjacent portions of the driver plates 66, and simultaneously these plates are swung inwardly by their operating mechanism, controlled by engagement of the rolls 142 on the stop block 141 with the bracket 96, to the position indicated in Fig. 7. As the operating member 22 now makes its characteristic downward swinging movement, the levers 144 are caused to engage the rear ends of the rack bars 118 to complete the operative movement of the plates 66 for driving the inturned ends of the binder into the shoe and for forcing the binder closely into its proper holding position along the opposite sides of the shoe. During this downward swinging movement of the member 22, as hereinbefore explained, the arm 18 is given a slight downward movement by the action of the eccentric 31 to press the upper down upon the margin of the shoe bottom, and at the same time is given a slight further movement lengthwise of the shoe due to the curve of the path taken by the outer end of the member 22, this final movement of the wipers and the connected mechanism toward the shoe serving to insure that the upper shall be forced closely into the angle between the feather and the shoulder or rib of the sole or insole as the binder is applied and fastened. Following these operations the parts are moved reversely to their starting positions and the shoe is released. As the arm 18 approaches its starting position, the lever arm 326 is carried into engagement with the stop 328, as hereinbefore explained, and trips the lever 240 to initiate the operation of the mechanism which feeds the wire and forms the binder. The operation of this mechanism has already been fully explained.

It will be evident that the operations of feeding the wire and of forming the binder, which are effected in a comparatively short interval of time, take place while the operator is picking up another shoe and arranging it in position to be pulled, and that the mechanisms having to do with the wire feeding and the forming of the binder interfere in no way with such a presentation of the shoe. Under normal conditions, by the time the operator is ready to trip the machine clutch to initiate the operation of the upper pulling mechanism, a new binder will have been completely formed and left in position to be applied to the shoe and the wire feeding mechanism and binder forming mechanism will have come automatically to rest. There is nothing, however, in the movements of the machine in the first stage of its cycle of operations to interfere with the operation of the wire feeding and binder forming means, and in case therefore the operator should present a shoe to the machine and trip the clutch more quickly than usual, the latter portion of the binder forming operation would be performed subsequently to such tripping of the clutch.

Having described the invention, what we claim as new and desire to secure by Letters Patent of the United States is:

1. In a machine of the class described, the combination with means for applying a lasting binder round the end of a shoe, of automatically controlled means for presenting a binder in position to be operated upon by said binder applying means.

2. In a machine of the class described, the combination with means for applying a lasting binder round the end of a shoe, of power driven means arranged to be actuated in time relation to the operation of said binder applying means for presenting a binder in position to be operated upon by the binder applying means.

3. In a machine of the class described, the combination with means for applying a binder to a shoe and forcing its ends into the shoe, of means for presenting a binder with angled ends in position to be operated upon by said binder applying means.

4. In a machine of the class described, the combination with shoe positioning means, of mechanism for applying a lasting binder round the end of the shoe, means for imparting operative movement to said mechanism and for then returning it to its idle position, and means automatically operative to present a binder to said binder applying mechanism while said mechanism is in its idle position.

5. In a machine of the class described, the combination with shoe positioning means, of binder applying mechanism movable toward and from the shoe, and means controlled by the movement of said mechanism away from the shoe for presenting a binder in position to be applied to a shoe in the next succeeding operation of said mechanism.

6. In a machine of the class described, the combination with shoe positioning means, of mechanism for applying a lasting binder round the end of the shoe, and binder presenting means automatically operative after said mechanism has operated upon a shoe to present a binder for the operation of the mechanism upon the next shoe.

7. In a machine of the class described, the combination with shoe positioning means, of means for working the upper of the shoe into lasted position round the end of the shoe, means for applying binder material round the end of the shoe to hold the upper in lasted position, and means for presenting the binder material in position to be operated upon by said applying means.

8. In a machine of the class described, the combination with shoe positioning means, of means for working the upper of the shoe into lasted position round the end of the shoe, means for applying binder material round the end of the shoe to hold the upper in lasted position, and means constructed and arranged for operation after the lasting of a shoe to feed binder material into position for use in lasting the next shoe.

9. In a machine of the class described, the combination with shoe positioning means, of means for working the upper of the shoe into lasted position round the end of the shoe, means for applying binder material round the end of the shoe, and means constructed and arranged for operation in time relation to other parts of the machine for presenting binder material in position to be operated upon by said binder applying means.

10. In a machine of the class described, the combination with shoe positioning means, of the end lasting wipers, means associated with said wipers for applying a binder to the shoe, power driven means for operating said wipers and binder applying means, and power operated means for presenting a binder in position to be operated upon by said binder applying means.

11. In a machine of the class described, the combination with shoe positioning means, of end lasting wiper mechanism movable toward and from the shoe, means for applying a binder to the shoe, and means controlled by the movement of said wiper mechanism for presenting a binder in position to be operated upon by said binder applying means.

12. In a machine of the class described, the combination with shoe positioning means, of end lasting wipers, means for operating said wipers, means for applying a binder to the shoe, power operated means for presenting a binder to said binder applying means, and means for actuating said presenting means in time relation to the operation of said wipers.

13. In a machine of the class described, the combination with shoe positioning means, of end lasting wipers movable toward and from the shoe, binder applying means mounted for movement with said wipers, and means arranged to be rendered operative upon a movement of said wipers and binder applying means away from the shoe to present a binder in position to be operated upon by the binder applying means in lasting the next shoe.

14. In a machine of the class described, the combination with shoe positioning means, of end lasting wipers, members movable adjacent to the overwiping faces of said wipers for applying a binder to the shoe, and means for presenting a binder in the path of movement of said members.

15. In a machine of the class described, the combination with shoe positioning means, of end lasting wipers, means for positioning a lasting binder adjacent to said wipers, means for presenting a binder to said positioning means, and means for applying the binder to the shoe.

16. In a machine of the class described, the combination with shoe positioning means, of end lasting wipers, means for positioning a binder adjacent to said wipers, means movable between said wipers and binder positioning means to apply the binder to the shoe, and means constructed and arranged for operation after the lasting of a shoe to present a binder in position to be operated upon by said binder applying means in lasting the next shoe.

17. In a machine of the class described, the combination with shoe positioning means, of end lasting wipers, a binder support opposite to the plane of the overwiping faces of said wipers, means movable between said support and wipers to apply a binder to the shoe, and power operated means for presenting a binder on said support.

18. In a machine of the class described, the combination with shoe positioning means, of means for working the upper of the shoe into lasted position round the end of the shoe, means for applying a binder round the end of the shoe and for forcing its ends into the shoe, and means constructed and arranged for operation after the lasting of a shoe to present a binder with angled ends in position to be operated upon in lasting the next shoe.

19. In a machine of the class described, the combination with shoe positioning means, of end lasting wipers, means for positioning a binder with angled ends adjacent to said wipers, means for applying said binder to the shoe and forcing its ends into the shoe, and means constructed and arranged to operate in time relation to the operation of said wipers and binder applying means for presenting a binder with angled ends in position to be operated upon by the binder applying means.

20. In a machine of the class described, the combination with shoe positioning means, of end lasting wipers, driver plates mounted for movement adjacent to said wipers to apply a binder round the end of the shoe and force its ends into the shoe, and means automatically operative to present a binder with angled ends in the path of movement of said driver plates.

21. In a machine of the class described, the combination with means for applying a lasting binder round the end of a shoe, of means for severing a section of binder material and for forming a binder therefrom and for positioning the binder for the operation of said binder applying means.

22. In a machine of the class described, the combination with means for applying a lasting binder round the end of a shoe, of means automatically controlled for operation after a binder has been applied to a shoe to prepare a binder for use upon the next shoe.

23. In a machine of the class described, the combination with means for applying a lasting binder round the end of a shoe, of power driven means arranged to be actuated in time relation to the operation of said binder applying means for forming and positioning a binder for the operation of the binder applying means.

24. In a machine of the class described, the combination with shoe positioning means, of binder applying mechanism movable toward and from the shoe, and power driven means arranged to be controlled by movement of said mechanism for forming a binder.

25. In a machine of the class described, the combination with shoe positioning means, of mechanism for applying a lasting binder round the end of the shoe, means for moving said mechanism toward the shoe and for then returning it to its idle position, and means arranged to be rendered operative in the return of said mechanism to its idle position to prepare a binder and position it for the next operation of said mechanism on a shoe.

26. In a machine of the class described, the combination with shoe positioning means, of means for applying a lasting binder round the end of the shoe, power operated binder forming mechanism, and means for starting said mechanism to form a binder following each application of a binder to a shoe.

27. In a machine of the class described, the combination with shoe positioning means, of binder forming means constructed to bend portions of the binder for attachment to the shoe, and means for operating upon the binder thus formed to apply it to the shoe.

28. In a machine of the class described, the combination with shoe positioning means, of means for forming a binder with attaching portions adapted to be forced into the shoe, and means for applying said binder to the shoe and forcing its attaching portions into the shoe.

29. In a machine of the class described, the combination with shoe positioning means, of means for preparing a binder with angled end portions for attachment to the shoe, and means for subsequently applying the binder to the shoe and fastening it.

30. In a machine of the class described, the combination with shoe positioning means, of means for severing a length of binder material from a continuous strand of such material, and means for subsequently bending said length of material round the end of the shoe and fastening it to the shoe.

31. In a machine of the class described, the combination with shoe positioning means, of means for severing a length of binder material from a continuous strand of such material, means for bending the ends of said severed portion, and means for operating upon the binder thus formed to apply it round the end of the shoe and to force its ends into the shoe.

32. In a machine of the class described, the combination with shoe positioning means, of means for applying a lasting binder round the end of the shoe, and binder forming means constructed and arranged to form a binder of predetermined length in the path of movement of said binder applying means and to leave it in position to be operated upon by said applying means.

33. In a machine of the class described, the combination with shoe positioning means, of means for applying a lasting binder to the shoe, binder forming means arranged to project in the path of movement of said binder applying means and constructed to shape the ends of the binder for attachment to the shoe, and means for withdrawing the binder forming means from said path after the binder is formed.

34. In a machine of the class described, the combination with shoe positioning means, of means for applying a lasting binder round the end of the shoe and for forcing its ends into the shoe, and binder forming means constructed and arranged to form a binder with angled ends in the path of movement of said binder applying means and to withdraw from said path to permit said binder applying means to operate.

35. In a machine of the class described, the combination with shoe positioning means, of means for applying a lasting binder round the end of the shoe, means for feeding a length of binder material into the path of movement of said binder applying means, and means for severing said length of material and leaving it in position to be operated upon by said binder applying means.

36. In a machine of the class described, the combination with shoe positioning means, of means for applying a lasting binder round the end of the shoe, means for feeding a length of binder material into the path of movement of said binder applying means, and means for severing said length of material and bending its ends and for leaving the binder thus formed in position to be operated upon by the binder applying means.

37. In a machine of the class described, the combination with shoe positioning means, of means for applying a lasting binder round the end of the shoe and for forcing its ends into the shoe, die blocks arranged to project in the path of movement of said binder applying means, means cooperating with said die blocks to bend the ends of a blank to form a binder, and means for withdrawing said die blocks from said path to permit the binder applying means to operate upon the binder.

38. In a machine of the class described, the combination with shoe positioning means, of means for applying a lasting binder round the end of the shoe, die blocks arranged to project in the path of movement of said binder applying means, means for feeding a length of binder material into operative relation to said die blocks, means for severing said length of material and for bending the ends of said severed material in conformity to the shape of said die blocks, and means for withdrawing the die blocks to permit the binder applying means to operate.

39. In a machine of the class described, the combination with means for applying a lasting binder round the end of a shoe, of means for severing a length of binder material from a continuous strand of such material and for forming a binder from said severed material to be operated upon by said binder applying means.

40. In a machine of the class described, the combination with means for applying a lasting binder round the end of a shoe, of means for feeding a strand of binder material, means for operating upon said material to straighten it, and means for severing a section of said material and for bending the ends of the severed portion to form a binder for the operation of the binder applying means.

41. In a machine of the class described, the combination with shoe positioning means, of binder applying means movable toward and from the shoe, and binder forming means mounted for movement toward and from the shoe with said binder applying means.

42. In a machine of the class described, the combination with shoe positioning means, of binder applying means movable toward and from the shoe and constructed to force the ends of the binder into the shoe to anchor the binder, and means constructed and arranged to form a binder with angled ends to be operated upon by said binder applying means, said binder forming means being mounted for movement toward and from the shoe with the binder applying means.

43. In a machine of the class described, the combination with shoe positioning means, of means for working the upper of the shoe into lasted position round the end of the shoe, means for forming a lasting binder, and means for operating upon the binder thus formed to apply it to the shoe.

44. In a machine of the class described, the combination with shoe positioning means, of means for working the upper of the shoe into lasted position round the end of the shoe, means for forming a lasting binder with angled ends, and means for operating upon the binder thus formed to apply it to the shoe and to force its ends into the shoe.

45. In a machine of the class described, the combination with shoe positioning means, of mechanism for working the upper of the shoe into lasted position round the end of the shoe, power driven means for forming a lasting binder, and means for actuating said binder forming means in time relation to the operation of said mechanism.

46. In a machine of the class described, the combination with shoe positioning means, of means for working the upper of the shoe into lasted position round the end of the shoe, means for applying a binder to the shoe, binder forming mechanism, and means for causing said binder forming mechanism to operate to form a binder each time that a shoe is lasted.

47. In a machine of the class described, the combination with shoe positioning means, of means for working the upper of the shoe into lasted position round the end of the shoe, means for applying a binder to the shoe, power driven binder forming mechanism, and means for actuating said forming mechanism following the lasting of each shoe.

48. In a machine of the class described, the combination with shoe positioning means, of mechanism for working the upper of the shoe into lasted position round the end of the shoe, said mechanism being movable toward and from the shoe, power driven means having an automatically limited cycle of movement for forming a lasting binder, and means for actuating said binder forming means through movement of said mechanism.

49. In a machine of the class described, the combination with shoe positioning means, of mechanism for working the upper of the shoe into lasted position round the end of the shoe, and power operated means arranged to be actuated in time relation to the operation of said mechanism for severing a length of binder material and for bending its ends to form a binder.

50. In a machine of the class described, the combination with shoe positioning means, of mechanism for working the upper of the shoe into lasted position round the end of the shoe, said mechanism being movable toward and from the shoe, and means for forming a lasting binder with angled ends adapted to be forced into the shoe, said binder forming means being movable toward and from the shoe with said mechanism.

51. In a machine of the class described, the combination with shoe positioning means, of mechanism for working the upper of the shoe into lasted position round the end of the shoe, said mechanism being movable toward and from the shoe, binder forming means supported for movement toward and from the shoe with said mechanism, and controlling means constructed and arranged to render said binder forming means operative after the lasting of a shoe to prepare a binder for use in lasting the next shoe.

52. In a machine of the class described, the combination with shoe positioning means, of mechanism for working the upper of the shoe into lasted position round the end of the shoe, said mechanism being movable toward and from the shoe, binder forming means supported for movement toward and from the shoe with said mechanism, power driven means including a clutch for operating said binder forming means, and means operated by movement of said mechanism away from the shoe for actuating said clutch.

53. In a machine of the class described, the combination with shoe positioning means, of mechanism for working the upper of the shoe into lasted position round the end of the shoe, said mechanism being movable toward and from the shoe, binder applying means mounted for movement toward and from the shoe with said mechanism, and means arranged to be rendered operative in the movement of said mechanism and binder applying means away from the shoe to form a binder for the operation of the binder applying means upon the next shoe.

54. In a machine of the class described, the combination with shoe positioning means, of mechanism for working the upper of the shoe into lasted position round the end of the shoe, means for operating said mechanism, means for applying a binder to the shoe, and means controlled by the movement of said mechanism for forming and positioning a binder for the operation of the binder applying means.

55. In a machine of the class described, the combination with shoe positioning means, of mechanism for working the upper of the shoe into lasted position round the end of the shoe, said mechanism being movable toward and from the shoe, means for applying a binder to the shoe, and power driven means arranged to be actuated upon a movement of said mechanism away from the shoe for forming and positioning a binder for the next operation of the binder applying means.

56. In a machine of the class described, the combination with shoe positioning means, of mechanism for working the upper of the shoe into lasted position round the end of the shoe, said mechanism being movable toward and from the shoe, means for applying a binder to the shoe and forcing its ends into the shoe, and means controlled by the movement of said mechanism for forming a binder with angled ends and positioning it for the operation of said binder applying means.

57. In a machine of the class described, the combination with shoe positioning means, of end lasting wipers movable toward and from the shoe, binder applying means supported for movement toward and from the shoe with said wipers, and means also supported for movement with the wipers for forming a binder and positioning it for the operation of said binder applying means.

58. In a machine of the class described, the combination with shoe positioning means, of end lasting wipers movable toward and from the shoe, binder applying means supported for movement toward and from the shoe with said wipers, and means also supported for movement with the wipers for feeding a length of binder material and forming it into a binder.

59. In a machine of the class described, the combination with shoe positioning means, of end lasting wipers movable toward and from the shoe, binder applying means supported for movement toward and from the shoe with said wipers and constructed to force the ends of the binder into the shoe, and binder forming means also supported for movement with the wipers, said binder forming means being constructed to feed and sever a length of binder material and to bend the ends of said material to form the binder.

60. In a machine of the class described, the combination with shoe positioning means, of end lasting wipers, members movable adjacent to the overwiping faces of said wipers for applying a binder to the shoe, and means for forming a binder and positioning it in the path of movement of said members.

61. In a machine of the class described, the combination with shoe positioning means, of end lasting wipers, members movable adjacent to the overwiping faces of said wipers for applying a binder to the shoe, and means for feeding a continuous strand of binder material into the path of movement of said members and for severing a length of such material to form a binder.

62. In a machine of the class described, the combination with shoe positioning means, of end lasting wipers, members movable adjacent to the overwiping faces of said wipers to apply a binder round the end of the shoe and force its ends into the shoe, means for feeding a length of binder material into the path of movement of said members, and means for bending the ends of said material to form a binder.

63. In a machine of the class described, the combination with shoe positioning means, of end lasting wipers, members movable adjacent to the overwiping faces of said wipers to apply a binder round the end of the shoe and force its ends into the shoe, binder forming devices arranged to project into the path of movement of said members, means for feeding binder material into operative relation to said devices, means co-operating with said devices to bend the ends of said material to form a binder, and means for withdrawing said devices from the path of movement of the binder applying members.

64. In a machine of the class described, the combination with shoe positioning means, of end lasting wipers, members movable adjacent to the overwiping faces of said wipers to apply a binder round the end of the shoe and force its ends into the shoe, die blocks arranged to project into the path of movement of said members, means for straightening a continuous strand of binder material and for feeding it into operative relation to said die blocks, means for severing a section of said material, means co-operating with said die blocks to bend the ends of the severed material, and means for withdrawing the die blocks from the path of movement of the binder applying members.

65. In a machine of the class described, the combination with shoe positioning means, of end lasting wipers, members movable adjacent to the overwiping faces of said wipers to apply a binder round the end of the shoe and force its ends into the shoe, means for operating said wipers and binder applying members, and means arranged to be rendered operative following the lasting of a shoe to form and position a lasting binder in operative relation to said members to be applied to the next shoe.

66. In a machine of the class described, the combination with shoe positioning means, of end lasting wipers, members movable adjacent to the overwiping faces of said wipers for applying a binder to the shoe, said members being constructed and arranged to permit a straight section of binder material to be positioned transversely of the wipers and in front of said members, and means for feeding a straight section of binder material transversely of the wipers into the path of movement of said members.

67. In a machine of the class described, the combination with shoe positioning means, of end lasting wipers, members movable adjacent to the overwiping faces of said wipers for applying a binder to the shoe, said members being constructed and arranged to permit a straight section of binder material to be positioned transversely of the wipers and in front of said members, die blocks arranged to be positioned substantially at opposite sides of the wipers and in front of said members, means for feeding a straight section of binder material transversely of the wipers and into operative relation to said die blocks, means co-operating with said die blocks to bend the ends of said material to form a binder, and means for withdrawing said die blocks and leaving the binder in front of said members.

68. In a machine of the class described, the combination with shoe positioning means, of end lasting wipers, supporting plates positioned opposite to the plane of the overwiping faces of said wipers with a space between said plates and wipers, binder applying members movable in said space for applying a binder to the shoe, and means for forming a binder and positioning it in said space for the operation of the binder applying members.

69. In a machine of the class described, the combination with shoe positioning means, of end lasting wipers, supporting plates positioned opposite to the plane of the overwiping faces of said wipers with a space between said plates and wipers, binder applying members movable in said space for applying a binder to the shoe, means for feeding a section of binder material into said space, and means for bending the ends of said material to form a binder.

70. In a machine of the class described, the combination with shoe positioning means, of end lasting wipers, supporting plates positioned opposite to the plane of the overwiping faces of said wipers and arranged to provide a space between said wipers and plates to receive a lasting binder, binder applying members movable between said wipers and supporting plates for applying a binder to the shoe, die blocks arranged to extend substantially across said space, means for feeding a section of binder material into operative relation to said die blocks, means co-operating with said die blocks to bend the ends of said material to form a binder, and means for withdrawing said die blocks to permit the binder to be applied to a shoe by the binder applying members.

71. In a machine of the class described, the combination with shoe positioning means, of means for applying a binder to the shoe, binder forming devices arranged to be moved into and out of the path of movement of said binder applying means, power driven mechanism for feeding a section of binder material into operative relation to said devices, means for controlling the operation of said mechanism, and connections to said controlling means for moving said forming devices alternately into and out of the path of movement of the binder applying means.

72. In a machine of the class described, the combination with shoe positioning means, of means for pulling over the upper of the shoe, end lasting wiper mechanism mounted for movement toward and from the shoe, binder applying means mounted for movement toward and from the shoe with said wiper mechanism, and means also movable with said wiper mechanism for preparing a binder and positioning it for the operation of said binder applying means.

73. In a machine of the class described, the combination with shoe positioning means, of means for pulling over the upper of the shoe, means for subsequently working the end portion of the upper into lasted position, means for applying a binder to the shoe, and means for presenting a binder for the operation of said binder applying means, said binder presenting means being constructed and arranged to permit its operation during the operation of the pulling-over means.

74. In a machine of the class described, the combination with shoe positioning means, of means constructed and arranged to pull the upper of the shoe and to hold the upper under tension with the machine at rest, means constructed and arranged to operate upon a subsequent starting of the machine to work the upper into lasted position and to apply a binder round the end of the shoe, and power operated means for preparing a binder for the operation of said binder applying means, said binder preparing means being constructed and arranged for operation during the operation of the upper pulling means.

75. In a machine of the class described, the combination with shoe positioning means, of means for pulling over the upper of the shoe, a support mounted for movement lengthwise of the shoe, means carried by said support for working the upper into lasted position and for applying a binder round the end of the shoe, and means also carried by said support for feeding and severing a section of binder material and positioning it for the operation of said binder applying means.

76. In a machine of the class described, the combination with shoe positioning means, of means for pulling over the upper of the shoe, means for working the upper into lasted position round the end of the shoe, means for applying a binder to the shoe to hold the upper in lasted position, and power driven means for presenting a binder for the operation of said binder applying means.

77. In a machine of the class described, the combination with shoe positioning means, of means for pulling over the upper of the shoe, means for working the upper into lasted position round the end of the shoe, means for applying a binder to the shoe to hold the upper in lasted position and for forcing the ends of the binder into the shoe, and power driven means for forming a binder with angled ends and positioning it for the operation of the binder applying means.

78. In a machine of the class described, the combination of means for feeding binder material, means for severing a section of such material of proper length to extend round the end of a shoe for holding the upper in lasted position, and means for forming a toe binder from the severed material.

79. In a machine of the class described, the combination of means for feeding binder material, means for severing a section of such material of proper length to extend round the end of a shoe and to terminate at the side of the forepart of the shoe, and means for bending portions of said section of binder material to form projections for use in fastening the binder to the shoe.

80. In a machine of the class described, the combination of means for feeding binder material, means for severing a section of such material of proper length for a toe binder, and means for bending the ends of said section of binder material to form projections adapted to be forced into the shoe.

81. In a machine of the class described, the combination of means for feeding binder material, means for straightening said material, means for severing a section of said straightened material of proper length to extend round the end of a shoe for holding the upper in lasted position, and means for bending the ends of the severed material to form a toe binder.

82. In a machine of the class described, the combination of means for feeding binder material, means constructed and arranged to straighten said material during its feeding movement, means for severing a section of the straightened material of proper length to extend round the end of a shoe and to terminate at the sides of the forepart of the shoe, and means for bending the ends of the severed material to form a toe binder.

83. In a machine of the class described, the combination of forming devices constructed for use in bending the ends of a section of binder material, said devices being arranged to operate upon a section of material of proper length for a toe binder, means for feeding material into operative relation to said devices, and means co-operating with said devices to bend the ends of said section of material to form prongs for anchoring the binder to the shoe.

84. In a machine of the class described, the combination of forming devices constructed for use in bending the ends of a section of binder material, said devices being arranged to operate upon a section of material of proper length to extend round the end of a shoe from one side of the toe to the other side, and mechanism constructed and arranged to bend the ends of said section of material in conformity to the shape of said devices.

85. In a machine of the class described, the combination of forming means for use in bending the ends of a section of binder material, said forming means being constructed to operate upon a section of material of proper length to extend round the end of a shoe and to terminate at the sides of the forepart of the shoe, and bending members arranged to co-operate with said forming means to bend the ends of the material to form projections extending in acute angular relation to the adjacent portions of the material for anchoring the binder to the shoe.

86. In a machine of the class described, the combination of a pair of die blocks spaced apart to operate upon the opposite ends of a section of binder material of proper length to extend round the end of a shoe for holding the upper in lasted position, means for straightening binder material and for feeding it into operative relation to said die blocks, and means for severing a section of said material and for bending the ends of the severed portion about said die blocks to form prongs for anchoring the binder to the shoe.

87. In a machine of the class described, the combination of a pair of die blocks spaced apart for operating upon the opposite ends of a section of binder material of proper length to extend round the end of a shoe and to terminate at the sides of the forepart of the shoe, means for feeding binder material into operative relation to said die blocks, and bending members arranged to co-operate with said die blocks to bend the ends of the section of material to form prongs adapted to be forced into the shoe.

88. In a machine of the class described, the combination of a pair of die blocks arranged to operate upon the opposite ends of a section of binder material of proper length for a toe binder, and bending members movable in convergent paths to bend the ends of the material about said die blocks.

89. In a machine of the class described, the combination of forming means about which to bend the ends of a section of binder material, said means being constructed to operate upon a section of material of proper length to extend round the end of a shoe and to terminate at the sides of the forepart of the shoe, means co-operating with said forming means to bend the ends of said section of material, and means for effecting a withdrawing movement of said forming means to permit displacement of the binder thus formed.

90. In a machine of the class described, the combination of a pair of die blocks constructed and arranged for use in bending the ends of a section of binder material of proper length to extend round the end of a shoe and to terminate at the sides of the forepart of the shoe, means co-operating with said die blocks to bend the ends of said section of material, means for moving said die blocks out of operative position after the binder is thus formed, and means for operating upon the binder to displace it from forming position.

91. In a machine of the class described, the combination of means for feeding binder material, forming means movable into and out of operative position transversely of the path of movement of said material, and mechanism co-operating with and movable relatively to said forming means to form a lasting binder adapted to hold a shoe upper about the toe in lasted position.

92. In a machine of the class described, the combination of means for feeding binder material, die blocks movable into and out of operative position transversely of the path of feeding movement of said material and constructed and arranged for use in bending the ends of a section of said material of proper length for a toe binder, devices co-operating with said die blocks to bend the ends of the section of material, and means for operating said devices and for then withdrawing the die blocks from operative position.

93. In a machine of the class described, the combination of forming means for use in bending the ends of a section of binder material, means for feeding binder material into operative relation to said forming means and for severing a section of said material and bending its ends, mechanism for controlling the operation of said last-named means, and connections to said controlling mechanism for moving said forming means into and out of operative position.

94. In a machine of the class described, the combination with shoe positioning means, of end lasting wipers and supporting plates arranged to receive between them a lasting binder having angled ends, means movable between said wipers and supporting plates for applying the binder to the shoe, and retaining means arranged to prevent premature displacement of the binder and yieldable in response to pressure of the binder in the operation of said binder applying means.

95. In a machine of the class described, the combination with shoe positioning means, of end lasting wipers and supporting plates arranged to provide a space between them for the reception of a lasting binder, means movable between said wipers and plates to apply the binder to the shoe, and spring controlled pins arranged to project transversely of said space at opposite sides of the wiper mechanism to prevent premature displacement of the binder.

96. In a machine of the class described, the combination with shoe positioning means, of end lasting wipers, means spaced from said wipers to permit a lasting binder to be introduced in the space thus provided, and means movable in said space for applying the binder to the shoe, said binder applying means being constructed to permit a substantially straight binder with angled ends to be positioned transversely of the wipers.

97. In a machine of the class described, the combination with shoe positioning means, of end lasting wipers, means movable in a path substantially parallel to the plane of said wipers to apply a fastener to the shoe, means for imparting a preliminary movement to said fastener applying means to move the fastener toward the shoe, and additional means for imparting a final movement to the fastener applying means to force the fastener into the shoe.

98. In a machine of the class described, the combination with shoe positioning means, of end lasting wipers, means movable in a path substantially parallel to the plane of said wipers to apply a fastener to the shoe, means for operating said wipers, mechanism connected to said fastener applying means to operate said means simultaneously with the wipers, and additional mechanism for completing the movement of said fastener applying means after the wipers have completed their operative movement.

99. In a machine of the class described, the combination with shoe positioning means, of end lasting wipers, members movable along the plane of the overwiping faces of said wipers for applying a binder having angled ends to the shoe and to force its ends into the shoe, means for moving said members relatively to the wipers to bend the binder round the end of the shoe, and additional means for imparting a final movement to said members to force the ends of the binder into the shoe.

100. In a machine of the class described, the combination with shoe positioning means, of end lasting wipers, members movable along the plane of the overwiping faces of said wipers to apply a binder to the shoe and to force the ends of the binder into the shoe, means for imparting operative movement to said wipers, mechanism connected to said binder applying members for operating them simultaneously with the wipers, and additional mechanism arranged to be operated after the wipers have completed their operative movement to complete the movement of said binder applying members.

101. In a machine of the class described, the combination with shoe positioning means, of end lasting wipers, means for moving said wipers toward the shoe, members movable toward the shoe with said wipers and constructed and arranged to apply a binder to the shoe and to force the ends of the binder into the shoe, and means operated by movement of said wipers and binder applying members toward the shoe to move said members relatively to the wipers for bending the binder round the shoe.

102. In a machine of the class described, the combination with shoe positioning means, of end lasting wipers, means for moving said wipers toward the shoe, members movable toward the shoe with said wipers and constructed and arranged to apply a binder to the shoe and to force the ends of the binder into the shoe, rack bars connected to said binder applying members, pinions engaging said rack bars, the rack bars and pinions being movable toward the shoe with the wipers, and additional rack bars arranged to engage said pinions and to be held substantially stationary for rendering said pinions operative to impart closing movement to said members.

103. In a machine of the class described, the combination with shoe positioning means, of end lasting wipers, means for operating said wipers, members mounted for swinging movement inwardly toward the opposite sides of the end portion of the shoe to apply a binder to the shoe, rack bars connected to said members, and means for imparting operative movements to said rack bars.

104. In a machine of the class described, the combination with shoe positioning means, of end lasting wipers, means for operating said wipers, members mounted for swinging movement inwardly toward the opposite sides of the end portion of the shoe to apply a binder to the shoe, rack bars connected to said members, means for operating said rack bars to cause said members to bend the binder round the end of the shoe during the operation of the wipers, and additional means constructed and arranged to engage the outer ends of said rack bars to impart a final closing movement to said members after the wipers have completed their operative movement.

105. In a machine of the class described, the combination with shoe positioning means, of end lasting wipers, means for operating said wipers, members movable along the plane of said wipers to apply a binder to the shoe, said members being constructed and arranged to operate upon a binder extending substantially straight across the wipers, means for moving said members relatively to the wipers to bend the binder round the shoe during the operative movement of the wipers, and other means for completing the operative movement of said members.

106. In a machine of the class described, the combination with shoe positioning means, of end lasting wiper mechanism, driver plates carried by said wiper mechanism for applying a binder to the shoe, and means comprising curved guide ribs on said plates and co-operating guideways in the wiper mechanism for determining the path of movement of said driver plates.

107. In a machine of the class described, the combination with shoe positioning means, of end lasting wipers, means for positioning a binder adjacent to said wipers, members movable between said wipers and binder positioning means for applying the binder to the shoe, and means for guiding said members for movement inwardly toward the sides of the shoe in a curved path with a component of bodily movement lengthwise of the shoe.

108. In a machine of the class described, the combination with shoe positioning means, of end lasting wipers arranged to embrace the end of the shoe, members movable along the plane of the overwiping faces of said wipers for applying a binder round the end of the shoe, and means for guiding said members for swinging movement about an axis in front of the intermediate portion of the wiper edges to cause them to have a component of movement along the binder during the application of the binder to the shoe.

109. In a machine of the class described, the combination with shoe positioning means, of end lasting wipers, members movable laterally of the shoe toward the opposite sides of the shoe to bend a binder round the end of the shoe and force it against the opposite side portions of the upper, and means for causing said members to receive a component of bodily movement along the binder and relatively to the wipers during their binder applying movement laterally of the shoe.

110. In a machine of the class described, the combination with shoe positioning means, of end lasting wipers, driver plates mounted to swing round the end of the shoe into substantially embracing relation to the margin of the upper to apply a binder to the shoe and force its ends into the shoe, and means for causing said plates to have a component of bodily movement relatively to the wipers and lengthwise of the shoe from the toe end to tighten the binder rearwardly.

111. In a machine of the class described, the combination with shoe positioning means, of toe lasting mechanism having means for applying a binder about the toe, and automatic means for feeding binder material to said toe lasting mechanism, 112. In a machine of the class described, the combination with shoe positioning means, of toe lasting mechanism having means for applying a binder about the toe, and means automatically operative in time relation to said toe lasting mechanism to present a binder to said mechanism.

113. In a machine of the class described, the combination with shoe positioning means, of toe lasting mechanism movable toward and from the shoe and having means for applying a binder about the toe, and feeding means movable toward and from the shoe with said toe lasting mechanism and automatically operative to feed toe binder material to said mechanism.

114. In a machine of the class described, the combination with shoe positioning means, of toe lasting mechanism having means for applying a binder about the toe, means for feeding binder material to said toe lasting mechanism, and means for severing a section of said material and for bending its ends to form a binder.

In testimony whereof we have signed our names to this specification.

CHARLES F. PYM.
ARTHUR F. PYM.